United States Patent
Moy et al.

(10) Patent No.: US 11,454,422 B2
(45) Date of Patent: Sep. 27, 2022

(54) WATER HEATING SYSTEM FOR CONTROLLING AN ABILITY TO SET A PARAMETER OF A CONTROLLER

(71) Applicant: Ademco Inc., Golden Valley, MN (US)

(72) Inventors: Brian Moy, Arden Hills, MN (US); Christopher R. Jones, Minneapolis, MN (US); Michael Crites, Minneapolis, MN (US); Arnold Kalla, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 363 days.

(21) Appl. No.: 16/833,500

(22) Filed: Mar. 27, 2020

(65) Prior Publication Data

US 2021/0302066 A1 Sep. 30, 2021

(51) Int. Cl.
| | |
|---|---|
| *F24H 9/20* | (2022.01) |
| *G08B 21/18* | (2006.01) |
| *G05D 23/00* | (2006.01) |
| *G05D 23/19* | (2006.01) |
| *G06F 3/0484* | (2022.01) |

(52) U.S. Cl.
CPC .......... *F24H 9/2007* (2013.01); *G05D 23/00* (2013.01); *G05D 23/1919* (2013.01); *G06F 3/0484* (2013.01); *G08B 21/182* (2013.01)

(58) Field of Classification Search
CPC ........ F24H 9/2007; F24H 9/20; F24H 9/2021; F24H 4/04; F24H 9/0005; G05D 23/00; G05D 23/1919; G06F 3/0484; G08B 21/182
See application file for complete search history.

(56) References Cited

U.S. PATENT DOCUMENTS

| 8,983,283 B2 * | 3/2015 | Miu | F24H 9/2021 236/43 |
| 2017/0052524 A1 * | 2/2017 | Kunz | G05B 19/0426 |
| 2019/0328576 A1 * | 10/2019 | Lowe | A61F 7/0085 |

FOREIGN PATENT DOCUMENTS

| CN | 201074912 Y | | 6/2008 | |
| CN | 107726635 A | | 2/2018 | |
| CN | 108549805 A | | 9/2018 | |
| CN | 106716341 B | * | 7/2019 | ............. B60K 35/00 |
| JP | 2004135040 A | * | 4/2004 | |
| JP | 4141713 B2 | * | 8/2008 | |
| JP | 6036501 B2 | * | 11/2016 | |
| WO | WO-2016145107 A2 | * | 9/2016 | ......... B60H 1/00771 |

* cited by examiner

*Primary Examiner* — Dung Hong
(74) *Attorney, Agent, or Firm* — Shumaker & Sieffert, P.A.

(57) ABSTRACT

This disclosure is related to devices, systems, and techniques for controlling a temperature of water contained by a water tank. A controller includes a user interface configured to receive one or more user inputs indicative of a request to set a control parameter of the controller and communication circuitry configured to receive, from a user device, an electronic signal. Additionally, the controller includes processing circuitry configured to identify, from the electronic signal, one or more first data packets that include a request to disable an ability to change, based on the one or more user inputs received by the user interface, the control parameter of the controller and in response to receiving the one or more first data packets, disable the ability to change the control parameter of the controller.

20 Claims, 6 Drawing Sheets

WATER HEATING SYSTEM FOR CONTROLLING AN ABILITY TO SET A PARAMETER OF A CONTROLLER

TECHNICAL FIELD

The disclosure relates to water heating systems.

BACKGROUND

Tank-type water heating systems may include a control device configured to regulate one or more parameters associated with a water tank, such as a set point temperature for a volume of water within the water tank. Some systems use a pilot light which ignites a main burner configured to heat water within the water tank. A control device may control one or both of an amount of time that the main burner is ignited or an amount of heat emitted by the main burner while it is ignited.

SUMMARY

In general, the disclosure is directed to devices, systems, and techniques for controlling an ability to set a parameter which is regulated by a controller. For example, a water heating system may include one or more water tanks, boilers, and water sources which are configured to supply hot water, via a piping system, to one or more water supply valves of a building or set of buildings. The one or more water tanks may include a water tank configured to increase a temperature of water as compared with a temperature of water supplied to the water tank from outside of the water heating system. In other words, the water tank may generate "hot" water and output the hot water to the piping system. The controller may, in some cases, regulate a temperature of the water inside the hot water tank.

A piping system may include one or more pipes and one or more water supply valves for showers, sinks, bathtubs, washing machines, coffee machines, and other such appliances and devices. As such, a water tank may supply hot water to a water supply valve such as a shower valve via the piping system. A temperature of the water stored by the water tank may affect a temperature of water which exits the one or more water supply valves of the piping system. In some examples, the controller receives an input to change a set point temperature of the water to be less than a lower bound temperature value or greater than an upper bound temperature value, causing a temperature of water exiting the one or more water supply valves of the piping system to be less desirable as compared with water exiting the one or more water supply valves of the piping system while the set point temperature of the water stored by the water tank is within a range from the lower bound temperature to the upper bound temperature.

In some examples, it may be beneficial for the controller to output a notification in response to receiving information indicative of a user request to change a set point temperature to be less than the lower bound temperature value or greater than the upper bound temperature value. A user device may display the notification of the attempt to change the set point temperature. Additionally, or alternatively, the user device may display a prompt to disable an ability to change the set point temperature using the controller. In some cases, in response to the prompt, the user device may receive information indicative of a request to disable the ability to change the set point temperature using the controller. In some cases, in response to the prompt, the user device may receive information indicative of a request to continue to enable the ability to change the set point temperature using the controller.

In some examples, a controller is configured to control a temperature of water contained by a water tank, where the controller includes a user interface configured to receive one or more user inputs indicative of a request to set a control parameter of the controller; and communication circuitry configured to receive, from a user device, an electronic signal. Additionally, the controller includes processing circuitry configured to: identify, from the electronic signal, one or more first data packets that include a request to disable an ability to change, based on the one or more user inputs received by the user interface, the control parameter of the controller; and in response to receiving the one or more first data packets, disable the ability to change the control parameter of the controller.

In some examples, a method for controlling a temperature of water contained by a water tank, the method includes receiving, by a user interface, one or more user inputs indicative of a request to set a control parameter of the controller; receiving, by communication circuitry from a user device, an electronic signal; identifying, by processing circuitry from the electronic signal, one or more first data packets that include a request to disable an ability to change, based on the one or more user inputs received by the user interface, the control parameter of the controller; and in response to receiving the one or more first data packets, disabling, by the processing circuitry, the ability to change the control parameter of the controller.

In some examples, a system includes a user device; and a controller configured to control a temperature of water contained by a water tank. The controller includes a user interface configured to receive one or more user inputs indicative of a request to set a control parameter of the controller; communication circuitry configured to receive, from the user device, an electronic signal; and processing circuitry configured to: identify, from the electronic signal, one or more first data packets that include a request to disable an ability to change, based on the one or more user inputs received by the user interface, the control parameter of the controller; and in response to receiving the one or more first data packets, disable the ability to change the control parameter of the controller.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

This disclosure describes devices, systems, and techniques for using a water heating system to enable or disable an ability to control a set point temperature for water held by a water tank using a controller. In some examples, the controller may be proximate to the water tank and may include any one or combination of an analog user interface (e.g., a dial) or a digital interface (e.g., a touchscreen) configured to receive a user input indicative of an attempt to change the set point temperature. In some examples, the controller may be configured to communicate with one or more user devices. A user device, in some examples, may receive a notification of an attempt to change the set point temperature for the water held by the water tank using the controller which is proximate to the water tank. In some examples, the user device is remote from the water tank. In turn, the user device may receive a notification to disable an ability to change the set point temperature using the controller.

Figure 1:
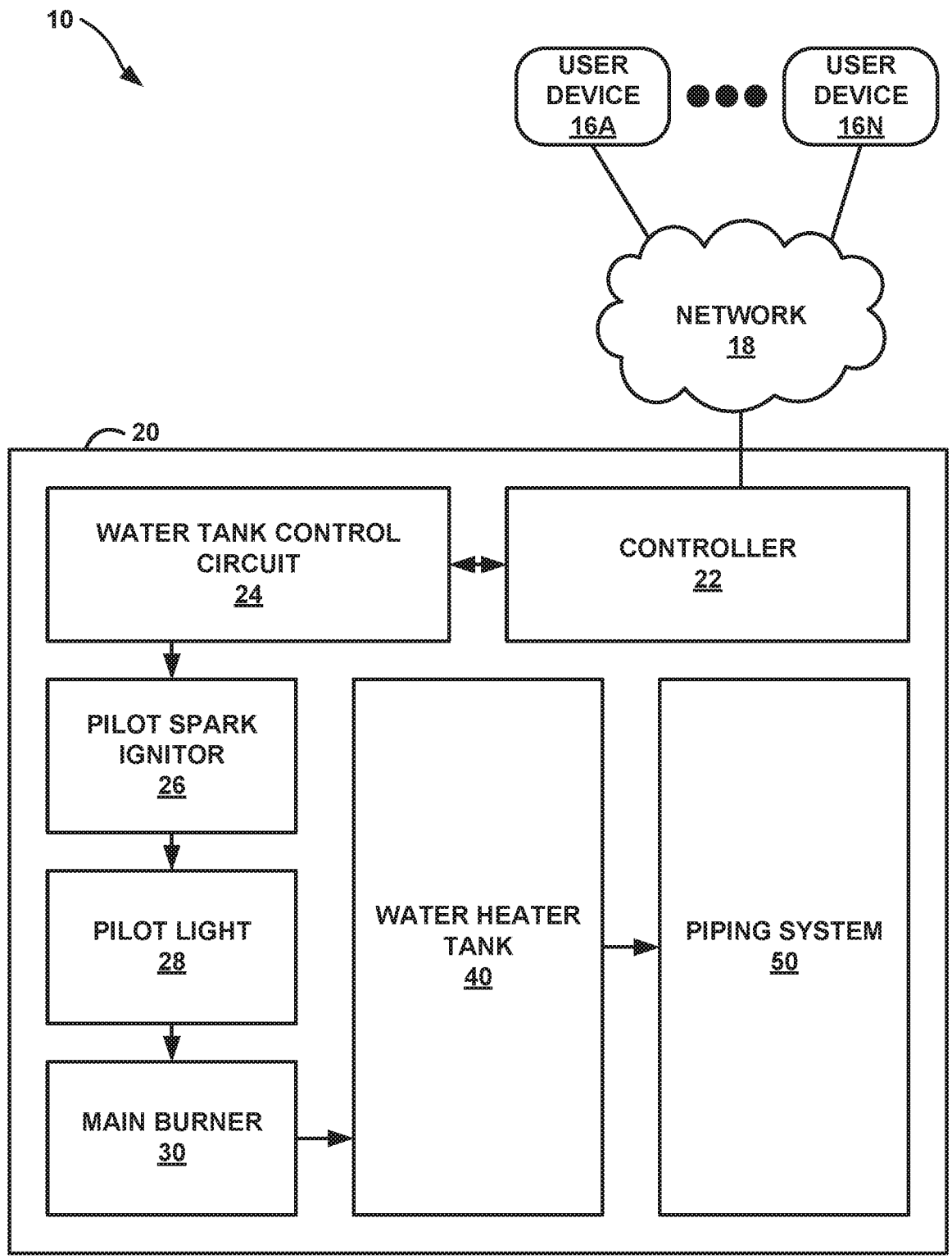
FIG. 1 is a block diagram illustrating a system for controlling an ability to change a set point temperature for water stored by water tank using a controller, in accordance with one or more techniques of this disclosure.

FIG. 1 is a block diagram illustrating a system 10 for controlling an ability to change a set point temperature for water stored by water tank 40 using a controller 22, in accordance with one or more techniques of this disclosure. As seen in FIG. 1, system 10 includes user devices 16A-16N (collectively, "user devices 16"), network 18, and local water temperature control system 20. Local water temperature control system 20 includes controller 22, water tank control circuit 24, pilot spark ignitor 26, pilot light 28, main burner 30, water tank 40, and piping system 50. In some cases, local water temperature control system 20 may be located within a building, within any one or more of a set of buildings, proximate to a building or a set of buildings, or any combination thereof.

User devices 16 may be any suitable communication or computing device, such as a conventional or landline phone, or a mobile, non-mobile, wearable, and/or non-wearable computing device capable of communicating over network 18 (e.g., smart phones, tablets, smart watches, laptop computers, desktop computers, or any combination thereof.) One or more of user devices 16 may support communication services over packet-switched networks such as network 18. In some examples, network 18 may represent the public Internet, including Voice over Internet Protocol (VOIP). One or more of user devices 16 may also support communication services over circuit-switched networks, e.g., the public switched telephone network (PSTN).

In some examples, controller 22 may be configured to control main burner 30 to regulate a temperature of water held by water tank 40. In some examples, controller 22 may receive, via one or both of a user interface (not illustrated in FIG. 1) or one of network devices 16, information indicative of a request to fix a set point temperature for the water held by water tank 40. Controller 22 may include processing circuitry configured to execute operations and a memory configured to store information. Additionally, controller 22 may include communication circuitry (not illustrated in FIG. 1) configured to communicate with user devices 16 and/or water tank control circuit 24. In some examples, controller 22 may be fastened to an outside wall of water tank 40. In some examples, controller 22 might not be physically connected to water tank 40 but may be located proximate to water tank 40 (e.g., located within the same room as water tank 40 or located within the same building as water tank 40).

In response to receiving information indicative of a request to change a set point temperature for the water held by water tank 40, controller 22 may determine whether an ability to change the set point temperature is in an enabled state or in a disabled state. In at least some examples where the ability to change the set point temperature is in the enabled state, controller 22 may change the set point temperature in response to receiving the information indicative of the request to change the set point temperature. In at least some examples where the ability to change the set point temperature is in the disabled state, controller 22 may maintain the set point temperature at a current set point temperature value in response to receiving the information indicative of the request to change the set point temperature.

In some examples, controller 22 may determine whether a request to change a set point temperature of the water held by water tank 40 represents an irregular attempt to change the set point temperature. An irregular attempt may to change the set point temperature may represent request to change the set point temperature to a sub-optimal value for demands by piping system 50. For example, it may be beneficial to maintain a temperature of the water within water tank 40 to be within a range from a lower bound temperature value and an upper bound temperature value. If the temperature of the water is below the lower bound temperature value, the temperature of the water output from water tank 40 to piping system 50 might not be as useful for applications such as hot showers, dishwashers, and clothes washing machines as compared with examples where the temperature of the water held by water tank 40 is within the range. If water is drawn from piping system 50 for a hot shower, the temperature of the water might not be sufficiently warm as compared with scenarios where the temperature of the water held by water tank 40 is within the range from the lower bound to the upper bound.

Additionally, if the temperature of the water held by water tank 40 is above the upper bound temperature value, the temperature of the water output from water tank 40 to piping system 50 might be more uncomfortable, more dangerous, or less optimal for the demands of piping system 50 as compared with examples where the temperature of the water held by water tank 40 is within the range form the lower bound temperature to the upper bound temperature. For example, if the temperature of the water held by water tank 40 is above the upper bound temperature value and the water flows from water tank 40 through the piping system 50 to water source meant for human contact (e.g., a sink or a shower), the water leaving the water source may be uncomfortably hot or dangerously hot, which is not beneficial. As such, it may be beneficial to prevent the temperature of the water within water tank 40 from increasing above the upper bound temperature value.

Controller 22 may determine that a request to change the set point value of the temperature of the water held by water tank 40 to be lower than the lower bound temperature value or change the set point temperature to be greater than the upper bound temperature value may represent an irregular request. In response to identifying the irregular request, controller 22 may generate a notification indicative of the irregular request to change the set point temperature using the user interface of controller 22, the notification including prompt to enable or disable the ability to set the temperature set point. In turn, controller 22 may output the notification to at least one user device of user devices 16 (e.g., user device 16A). In some examples, user device 16A may display, on a user interface, text indicating the irregular request to change the set point temperature and display prompt to enable or disable the ability to change the temperature set point.

In some examples, user device 16A may receive, via user interface, information indicative of a user selection to disable the ability to change the set point temperature value for the water inside water tank 40 in response to the irregular request to change the set point temperature value. User device 16A may output a message including the user selection to disable the ability to change the set point temperature to controller 22. In turn, controller 22 may lock the ability to change the set point temperature value for the water inside water tank 40 using the user interface of controller 22. In some examples, controller 22 might have changed the set point temperature in response to the irregular request to change the set point temperature. In some such examples, controller 22 returns the set point temperature value to an original set point temperature value in response to receiving the selection to disable the ability to change the set point temperature value. In some examples, user device 16A may receive, via user interface, information indicative of a user selection to maintain the ability to change the set point temperature value in an enabled state in response to the irregular request to change the set point temperature value.

Water tank control circuit 24 may control an amount of time in which main burner 30 and/or control an intensity of heat emitted by main burner 30 in order to regulate a temperature of the water held by water tank 40. In some examples, pilot spark ignitor 26, pilot light 28, and main burner 30 are located proximate to a bottom of water tank 40. In some examples, pilot spark ignitor 26, pilot light 28, and main burner 30 are located underneath a water tank of water tank 40. As such, main burner 30 may heat the water held by water tank 40 from the bottom of the water tank of water tank 40.

In some examples, to ignite main burner 30, water tank control circuit 24 may control a first fuel valve in order to supply fuel to pilot light 28 and control a second fuel valve in order to supply fuel to main burner 30. Subsequently, water tank control circuit 24 may output an electrical signal to pilot spark ignitor 26, causing pilot spark ignitor 26 to emit one or more sparks which ignite pilot light 28. In turn, the ignited pilot light 28 may ignite main burner 30 in order to heat the water held by water tank 40.

In some examples, water tank control circuit 24 may extinguish one or both of pilot light 28 and main burner 30 by outputting a signal to close the first fuel valve and outputting a signal to close the second fuel valve, respectively. In this way, water tank control circuit 24 may regulate the temperature of the water held by water tank 40 by controlling an amount of time that main burner 30 is ignited. Additionally, or alternatively, water tank control circuit 24 may control the second fuel valve in order to regulate a rate in which fuel is delivered main burner 30. The rate in which fuel is delivered main burner 30 may determine an intensity of heat emitted by main burner 30. As such, water tank control circuit 24 may regulate the temperature of water held by water tank 40 by controlling an amount of time that main burner 30 is ignited and/or controlling an intensity of main burner 30.

In some examples, pilot light 28 represents an intermittent pilot light which is ignited by water tank control circuit 24 when needed and maintained in a deactivated state when it is not necessary for pilot light 28 to be ignited. In some examples, pilot light 28 represents a standing pilot light which is ignited continuously. In some examples, a flame emitted by pilot light 28 is not as intense as a flame emitted by main burner 30. Pilot spark ignitor 26 may be located proximate to pilot light 28 such that sparks emitted from pilot spark ignitor 26 may ignite pilot light 28. Additionally, Pilot light 28 may be located proximate to main burner 30 such that the flame emitted by pilot light 28 may ignite main burner 30.

Water tank 40 may represent a device configured to heat water using energy emitted by main burner 30. For example, water tank 40 may include a water tank configured to hold a volume of water. In some examples, controller 22 is configured to control a temperature of the water inside of water tank 40 based on one or more set point temperatures. For example, controller 22 may instruct water tank control circuit 22 to regulate the temperature of the water held by water tank 40 to be equal to the set point temperature.

Water tank 40 may output hot water to piping system 50, which includes a set of water sources for using hot water (e.g., showers, bathtubs, dishwashers, coffee machines, washing machines, sinks, or any combination thereof. In some examples, piping system 50 may include metal pipes, plastic pipes, or other types of pipes. Additionally, in some examples, at least some water may return to water tank 40 from piping system 50. The water returning to water tank 40 from piping system 50 may, in some cases, have a lower temperature than water supplied to piping system 50 by water tank 40. In some examples, water tank 40 may receive water from a water source outside of water temperature control system 20 (e.g., a municipal water system, a well, a cistern, or any combination thereof).

Figure 2:
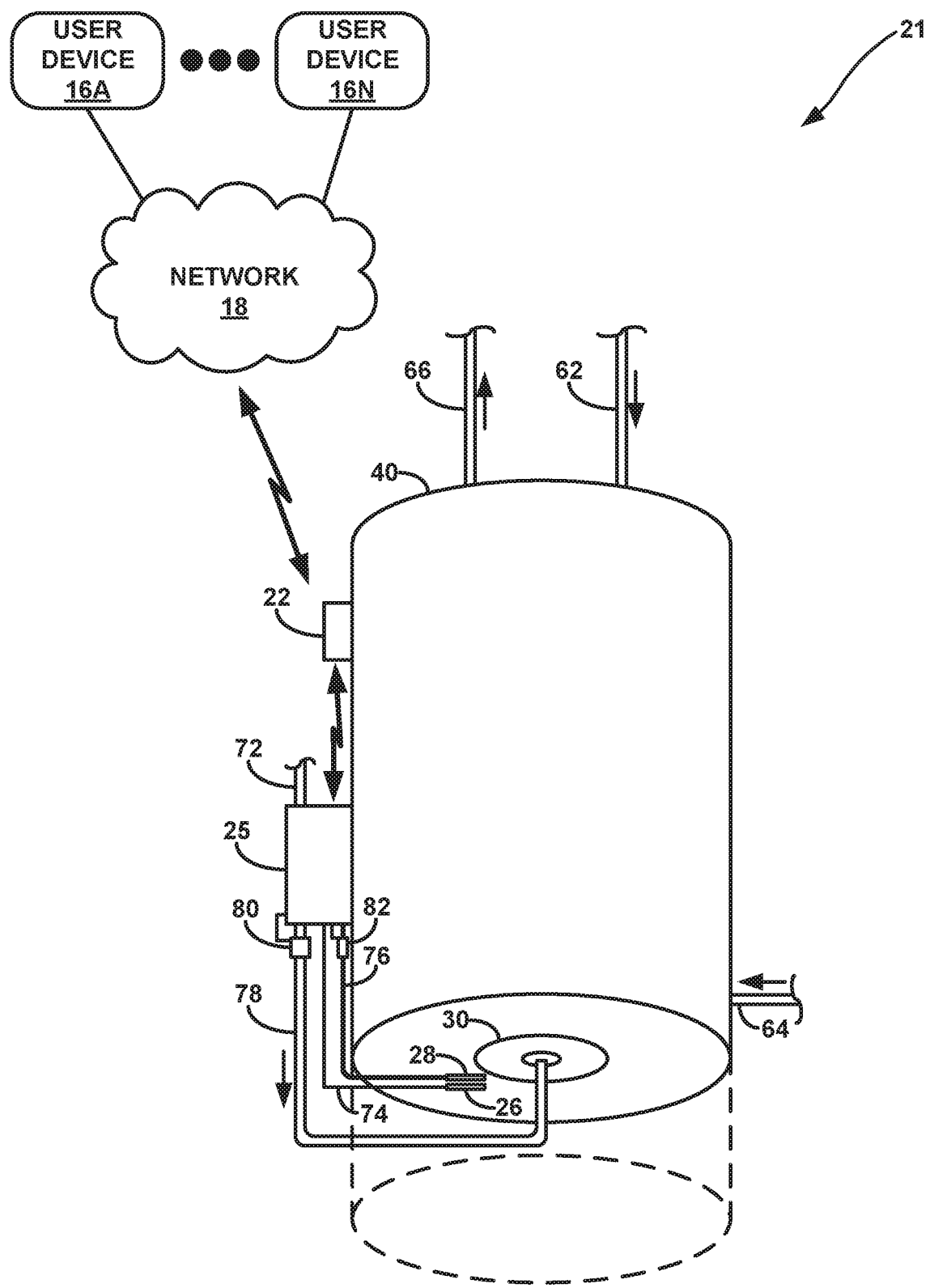
FIG. 2 is a conceptual diagram illustrating an example water temperature control system, in accordance with one or more techniques of this disclosure.

FIG. 2 is a conceptual diagram illustrating an example water temperature control system 21, in accordance with one or more techniques of this disclosure. As seen in FIG. 2, water temperature control system 21 includes controller 22, water temperature control unit 25, pilot spark ignitor 26, pilot light 28, main burner 30, and water tank 40. Although not shown by FIG. 2, water temperature control unit 25 may include water tank control circuit 24 of FIG. 1. Pilot spark ignitor 26 may be electrically connected to water temperature control unit 25 by electrical line 74. Water temperature control unit 25 may deliver fuel to pilot light 28 via fuel line 76. Water temperature control unit 25 may deliver fuel to main burner 30 via fuel line 78. Water temperature control system 21 may be configured to perform one or more techniques described with respect to water temperature control system 20 of FIG. 1.

As seen in FIG. 2, system 21 includes a water tank 40 which is configured to receive water via an input pipe 62 and input pipe 64 (collectively, "input pipes 62, 64") and supply water via output pipe 66. For example, main burner 30 may heat water held by water tank 40 for supply to a piping system (e.g., piping system 50 of FIG. 1) via output pipe 66. At least some of the water supplied to the piping system circuit via output pipe 66 may return to water tank 40 via one of input pipes 62, 64. Additionally, water tank 40 may receive water from a water source outside of water temperature control system 21 via the other one of input pipes 62, 64 which does not return water from the piping system. By returning at least some of the water output to the piping system via output pipe 66, water temperature control system 21 may require a smaller volume of water supplied from an outside water source as compared with water temperature control systems which do not return any water output from a water tank.

In some examples, a temperature of the water held by water tank 40 may vary depending on a location of the water within water tank 40. For example, water located proximate to a top end of water tank 40 may include a higher temperature than water located proximate to a bottom end of water tank 40. The temperature of the water held by water tank 40 may increase as a function of a vertical axis extending from the bottom end of water tank 40 to the top end of water tank 40. In this way, it may be beneficial for the output pipe 66 to draw water from the top of the water tank 40 in order to provide the hottest water held by water tank 40 to the piping system. Water temperature control unit 25 may control a temperature of water held in various locations of water tank 40 based on one or more signals received by controller 22. For example, one or more temperature sensors (not illustrated in FIG. 2) may generate data indicative of a current temperature of water at one or more respective locations within water tank 40. Based on a set point water temperature and the data indicative of the current water temperature, water temperature control unit 25 may control main burner 30 in order to regulate the temperature of the water held by water tank 40 to approach the set point temperature.

In some examples, water temperature control unit 25 controls the temperature of the water within water tank 40 at least by regulating an amount of fuel delivered to pilot light 28 and main burner 30 via fuel line 76 and fuel line 78, respectively. Fuel line 78 may be in fluid communication with main valve 80, which controls fuel flow to a main burner 30. Additionally, in some examples, a flue may be an exhaust for main burner 30 in water temperature control system 21. Pilot valve 82 may control fie flow to pilot light 28 through fuel line 76. Pilot valve 82 may be substantially in parallel, substantially in series, or in some other arrangement with main valve 80, and fuel to pilot light 28 may come from fuel line 72 or some other source. In some examples, control unit 25 may output a main valve control signal and a pilot valve control signal in order to independently control main valve 80 and pilot valve 82, respectively. In some examples, the main valve control signal may control whether fuel is able to cross main valve 80 and arrive at main burner 30 and/or control a rate in which fuel is delivered to main burner 30. In some examples, the pilot valve control signal may control whether fuel is able to cross pilot valve 82 and arrive at pilot light 28 and/or control a rate in which fuel is delivered to pilot light 28. By controlling a rate in which fuel is delivered to main burner 30, for example, water temperature control unit 25 may control a heat intensity of main burner 30. If main burner 30 is ignited an intensity of main burner may be correlated with the rate in which fuel is delivered to main burner 30.

Pilot spark ignitor 26 may ignite gas delivered to pilot light 28 via gas line 76. For example, to ignite pilot light 28, water temperature control unit 25 may control pilot valve 82 in order to deliver fuel to pilot light 28. Subsequently, water temperature control unit 25 may output an electrical signal through electrical line 74 in order to cause pilot spark ignitor 26 to emit one or more sparks which ignite the gas emitted from pilot light 28. In turn, pilot light 28 may continuously emit a flame as long as pilot valve 82 is sufficiently activated to deliver gas to pilot light 28. Water temperature control unit 25 may be configured to extinguish pilot light 28 by outputting the pilot valve control signal in order to close pilot valve 82, thus cutting off a delivery of fuel to pilot light 28.

Pilot light 28 may ignite gas delivered to main burner 30 via gas line 78. For example, to ignite main burner 30, water temperature control unit 25 may output the main valve control signal in order to activate main burner 30 and deliver fuel to main burner 30. When pilot light 28 is ignited, pilot light 28 may cause gas emitted by main burner 30 to ignite and continuously give off a flame. In some examples, main burner 30 may continue to give off a flame even if water temperature control unit 25 extinguishes pilot light 28 after main burner 30 is ignited. Water temperature control unit 25 may be configured to extinguish main burner 30 by outputting the main valve control signal in order to close main valve 80, thus cutting off a delivery of fuel to main burner 30.

In some examples, water temperature control unit 25 may regulate a temperature of water within water tank 40 based on one or more set point temperatures. For example, water temperature control unit 25 may receive data indicative of the one or more set point temperatures from controller 22. Controller 22 may include a user interface such as a dial which is configured to receive a user selection of the one or more temperature set points. Additionally, or alternatively, controller 22 may receive data indicative of a user selection of the one or more temperature set points form user devices 16 via network 18. In turn, controller 22 may transmit the data indicative of the one or more set point temperatures to water temperature control unit 25 in order to cause water temperature control unit 25 to regulate the temperature of the water held by water tank 40 based on the one or more set point temperatures. For example, if water temperature control unit 25 receives data indicative of a request to increase a set point temperature, water temperature control unit 25 may control main burner 30 to increase a temperature of the water held by water tank 40 in order to match the increased set point temperature. Additionally, or alternatively, if water temperature control unit 25 receives data indicative of a request to decrease a set point temperature, water temperature control unit 25 may control main burner 30 to decrease a temperature of the water held by water tank 40 in order to match the decreased set point temperature. Although water temperature control unit 25 is illustrated as being separate form controller 22, water temperature control unit 25 and controller 22 may, in some examples, be conjoined or contained within the same device.

Figure 3:
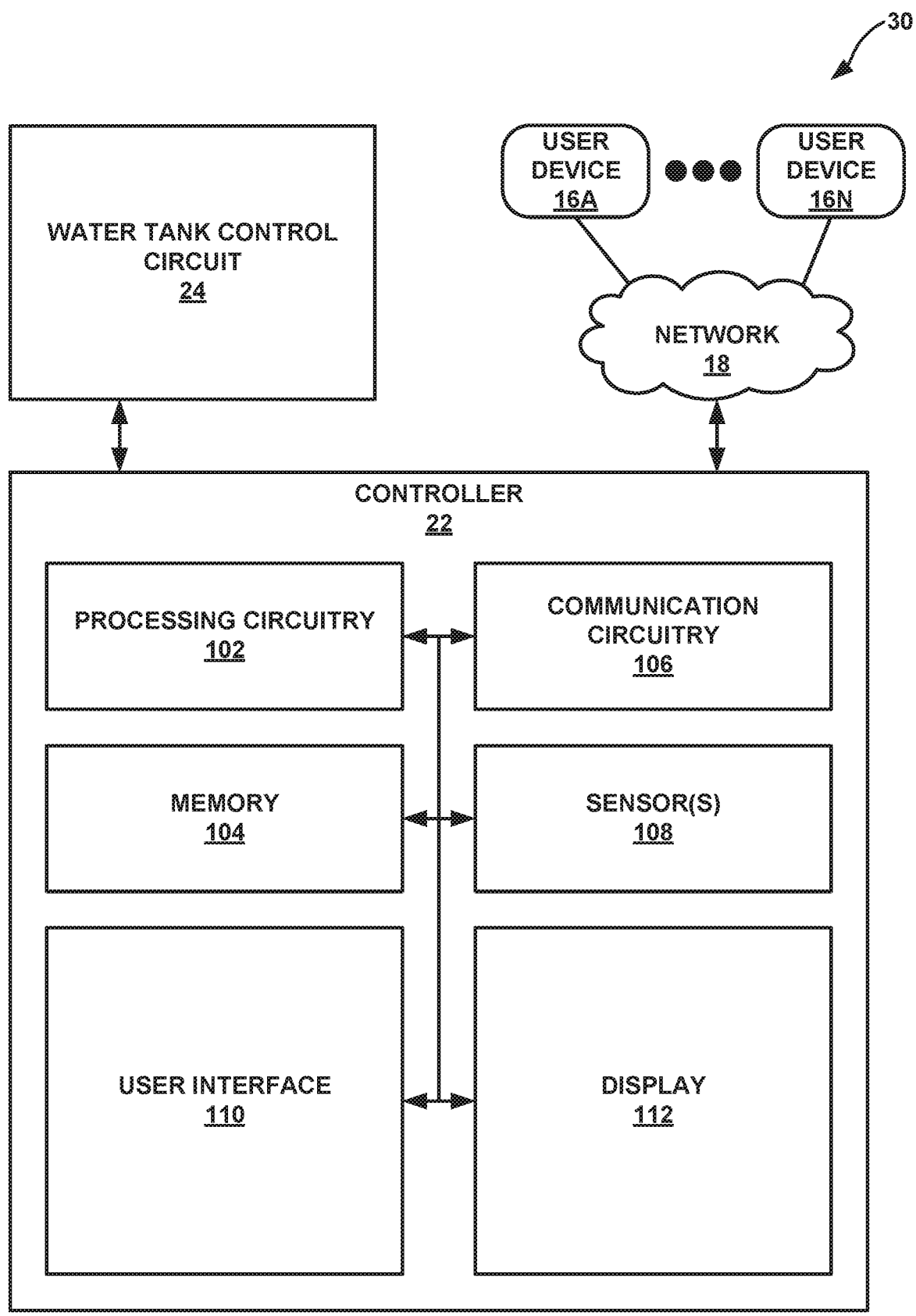
FIG. 3 is a block diagram illustrating a system including the controller of FIG. 1, in accordance with one or more techniques of this disclosure.

FIG. 3 is a block diagram illustrating a system 30 including a controller 22, in accordance with one or more techniques of this disclosure. As seen in FIG. 3, system 30 includes user devices 16, network 18, controller 22, and water tank control circuit 24. Controller 22 includes processing circuitry 102, memory 104, communication circuitry 106, sensor(s) 108, user interface 110, and display 112. In some examples, system 30 may include a at least a portion of system 10 of FIG. 1 and/or at least a portion of system 21 of FIG. 2.

An example architecture of controller 22 is illustrated in FIG. 3, but this example architecture is not meant to be limiting. Controller 22 may include other example architectures, in some cases. In some examples, controller 22 may be physically attached to a water tank such as water tank 40 of FIGS. 1-2 and/or physically attached to an object which may be physically attached to a water theater. In other examples, controller 22 may be located proximate to a water tank without being physically connected to the water tank.

In some examples, controller 22 may output data to water tank control circuit 24 and/or receive data from water tank control circuit 24 via an electrical conductor. In some examples, controller 22 may output data to water tank control circuit 24 and/or receive data from water tank control circuit 24 via a wireless connection. Controller 22 may exchange data with on or more of user devices 16 via a wireless network 18, such as the Internet.

Controller 22, in some examples, may receive information indicative of one or more temperature set points for water held by a water tank such as water tank 40 of FIGS. 1-2. In turn, controller 22 may output information indicative of the one or more temperature set points to water tank control circuit 24 in order to cause water tank control circuit 24 to regulate the temperature of the water held by the water tank based on the one or more temperature set points. In some examples, controller 22 and water tank control circuit 24 may be electrically integrated. In some examples, although illustrated as being separate, controller 22 and water tank control circuit 24 may be part of the same device.

Processing circuitry 102, in some examples, may include one or more processors that are configured to implement functionality and/or process instructions for execution within controller 22. For example, processing circuitry 102 may be capable of processing instructions stored in a memory, such as memory 104. Processing circuitry 102 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 102 may include any suitable structure, whether in hardware, software, firmware, or any combination thereof, to perform the functions ascribed herein to processing circuitry 102.

In some examples, memory 104 includes computer-readable instructions that, when executed by processing circuitry 102, cause controller 22 and processing circuitry 102 to perform various functions attributed to controller 22 and processing circuitry 102 herein. Memory 104 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Communication circuitry 106 may include any suitable hardware, firmware, software or any combination thereof for communicating with another device, such as user devices 16 or water tank control circuit 24. Under the control of processing circuitry 102, communication circuitry 106 may receive downlink telemetry from, as well as send uplink telemetry to, user devices 16, water tank control circuit 24, or another device. Communication circuitry 106 may include any combination of a Bluetooth® radio, an electronic oscillator, frequency modulation circuitry, frequency demodulation circuitry, amplifier circuitry, and power switches such as a metal-oxide-semiconductor field-effect transistors (MOSFET), a bipolar junction transistor (BJT), an insulated-gate bipolar transistor (IGBT), a junction field effect transistor (JFET), or another element that uses voltage or current for its control.

In some examples, processing circuitry 102 communicates with sensor(s) 108. Sensor(s) 108 may include any one or combination of temperature sensors, accelerometers touch sensors, motion sensors, or dial rotation sensors. Sensor(s) 108 may generate signals which are relevant to an operation of one or both of controller 22 or water tank control circuit 24.

User interface 110, in some examples, may include one or more components configured to receive information indicative of one or more user inputs. For examples, user interface 110 may include a dial. In some examples, controller 22 represents a circular shape and the dial is located at an outer circumference of controller 22, but this is not required. In some examples where user interface 110 represents a dial, the dial may be located within an outer boundary of controller 22. In some examples, user interface 110 includes other interfaces in addition to the dial or alternatively to the dial. For example, user interface 110 may include a touch screen including a presence sensitive device to detect user inputs to controller 22. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. In this way, one or more components may be a part of both of display 112 and user interface 110.

Display 112 may display information indicative of one or more parameter values such as one or more temperature set point values for water held by a water tank. Additionally, or alternatively, display 112 may display information indicative of a current temperature of water held by the water tank. Display 112 of controller 102 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user.

In some examples, processing circuitry 102 is configured to receive information indicative of a user attempt to change a control parameter of controller 22 from a first control parameter value to a second control parameter value. In some examples, processing circuitry 102 receives the information from user devices 16 via network 18 and communication circuitry 106. In some examples, processing circuitry 102 receives the information from user interface 110 and, and the user attempt to change the control parameter value represents a user input to user interface 110. In some examples where user interface 110 includes a dial, the user attempt to change the control parameter value represents a rotation of the dial. For example, user interface 110 may include circuitry which is configured to generate the information indicative of the user attempt to change the control parameter based on an amount of rotation of the dial.

Processing circuitry 102 is configured to determine if an he attempt to change the control parameter of the controller 22 from a first control parameter value to a second control parameter value represents an irregular attempt to change the control parameter. An irregular attempt to change the control parameter may represent an attempt to change the control parameter in a way which may cause discomfort to one or more users who come in contact with water that is held by a water tank (e.g., water tank 40 of FIG. 1) and output to a piping system (e.g., piping system 50). For example, if the control parameter represents a set point temperature value for water held by a water tank, it may be uncomfortable or dangerous for a user to take a shower supplied using water held by the water tank if the set point temperature for the water held by the water tank is greater than an upper limit of a comfort range. Additionally, or alternatively, if the control parameter represents a set point temperature value for water held by a water tank, it may be uncomfortable or dangerous for a user to take a shower supplied using water held by the water tank if the set point temperature for the water held by the water tank is lower than an lower limit of a comfort range.

In some examples, to determine if the attempt to change the control parameter of controller 22 represents an irregular attempt to change the control parameter, processing circuitry 102 is configured to determine whether the second control parameter value is outside a range of control parameter values from a first threshold control parameter value to a second threshold control parameter value. For example, processing circuitry 102 may determine if the second control parameter value is less than a first threshold control parameter value or determine if the second control parameter value is greater than a second threshold control parameter value, where the second threshold control parameter value is greater than the first control parameter value. The first threshold control parameter value may represent a control parameter value which would represent a lower bound of a comfort range for water held by a water tank and the second threshold control parameter value may represent a control parameter value which would represent an upper bound of the comfort range.

Processing circuitry 102 may determine that the attempt to change the control parameter of the controller represents an irregular attempt if the second control parameter value is less than the first threshold control parameter value or if the second control parameter value is greater than the second threshold control parameter value. In other words, of the second, intended control parameter value would place the control parameter value outside of the comfort range, processing circuitry 102 may determine that the attempt is an irregular attempt. In some examples, the irregular attempt to change the control parameter may represent an attempt by a child or a vulnerable adult to change the control parameter value in a potentially uncomfortable or dangerous manner. For example, a child may turn a dial of user interface 110, which may represent the irregular attempt to change the parameter value. Processing circuitry 102 may detect the irregular attempt and generate a notification indicating the irregular attempt.

In some examples, to determine if the attempt to set the control parameter of the controller 22 represents an irregular attempt, processing circuitry 102 is configured to calculate a magnitude of a difference between the first control parameter value and the second control parameter value. Subsequently, processing circuitry 102 may determine that the attempt to change the control parameter of the controller represents the irregular attempt if the magnitude of the difference between the first control parameter value and the second control parameter value is greater than a threshold difference value. In examples where the control parameter represents a set point temperature for water held by a water tank, it may be unusual to change the set point temperature of the water held by the water tank by a more than a margin such as the threshold difference value.

Responsive to determining that an attempt to change the control parameter of controller 22 represents an irregular attempt, processing circuitry 102 is configured to generate a notification of the irregular attempt. Subsequently, processing circuitry 102 is configured to output the notification of the irregular attempt, the notification including a prompt to disable the ability to set the control parameter of controller 22. In some examples, processing circuitry 102 outputs the notification to one of user devices 16 (e.g., user device 16A). In some examples, the one of user devices 16 may be associated with an administrator of system 30. User device 16A may, in some examples, include a display such as an LCD, dot matrix display, LED display, OLED display, e-ink, or similar monochrome or color display capable of outputting visible information. As such, the display of user device 16A may display the notification including the prompt to disable the ability to set the control parameter of controller 22.

In some examples, processing circuitry 102 may receive, from user device 16A or another one of user devices 16, data including information indicative of a request to disable the ability to set, based on one or more user inputs received by user interface 110, the control parameter of the controller 22. In turn, processing circuitry 102 may disable the ability to set the control parameter. For example, the information indicative of the request to disable the ability to set the control parameter may represent a request by an administrator of system 30 to disable an ability to change a set point temperature for water held by a water tank (e.g., water tank 40 of FIG. 1) via user interface 110, thus preventing a person (e.g., a child) from changing the set point temperature to an uncomfortable and/or dangerous temperature set point value.

In some examples where user interface 110 includes a dial, controller 22 may allow the dial to rotate while the ability to set the control parameter of controller 22 is disabled. In one or more such examples, a rotation of the dial might not cause processing circuitry 102 to alter or set the control parameter. Consequently, system 30 may prevent a person from changing a temperature set point for water held by a water tank to a dangerous and/or an uncomfortable level in response to receiving data representing an administrator's election to disable the ability to change the temperature set point.

Processing circuitry 102 may output a notification indicating an irregular attempt to change the control parameter of controller 22. In some examples, controller 22 may receive data indicative of a request to maintain an ability to change the control parameter. This may cause processing circuitry 102 to change the control parameter of controller 22 even though processing circuitry 102 determines that the attempt to change the control parameter represents an irregular attempt. In this way, system 30 may allow an election to "ignore" a determination of an irregular attempt to change the set point temperature. In other examples, controller 22 may receive data indicative of a request to disable an ability to change the control parameter and processing circuitry 102 may subsequently disable the ability. In some cases, disabling the ability to change the control parameter may cause processing circuitry 102 to reverse any change of the control parameter that is made due to the irregular attempt to change the control parameter. For example, processing circuitry 102 may change the control parameter after receiving information indicative of the irregular attempt to change the control parameter. In response to receiving a request to disable the ability to disable the ability to change the control parameter form user device 16, processing circuitry 102 may reverse the change of the control parameter caused by the irregular attempt to change the control parameter.

In some examples, processing circuitry 102 may be configured to store information indicating whether the ability to change the control parameter of controller 22 is enabled or disabled in memory 104. Such information may allow processing circuitry 102 to determine whether an input to user interface 110 or a request from user devices 16 can cause processing circuitry 102 to change the control parameter of controller 22. For example, if the ability to change the control parameter of controller 22 is enabled, processing circuitry 102 may output an instruction to change a value for the control parameter in response to receiving one or more user inputs at user interface 110 or in response to receiving a request to change the control parameter from one of user devices 16. Alternatively, if the ability to change the control parameter of controller 22 is disabled, processing circuitry 102 may output an instruction to maintain a value of the control parameter in response to receiving one or more user inputs at user interface 110 or in response to receiving a request to change the control parameter from one of user devices 16.

Memory 104 may be configured to store data indicative of one or more control parameter values for system 30. For example, the one or more control parameter values may include one or more temperature set point values for water held by a water tank, such as water tank 40 of FIGS. 1-2. Controller 22 may output one or more signals to water tank control circuit 24 in order to cause water tank control circuit 24 to regulate the temperature of the water held by water tank 40 according to the one or more temperature set points. In some examples, controller 22 may output information indicative of the one or more temperature set points to water tank control circuit 24, and water tank control circuit 24 may regulate the temperature of the water based on the information indicative of the one or more set points. In some examples, controller 22 may output one or more control signals to water tank control circuit 24 in order to cause water tank control circuit 24 to regulate the temperature of the water.

Figure 4:
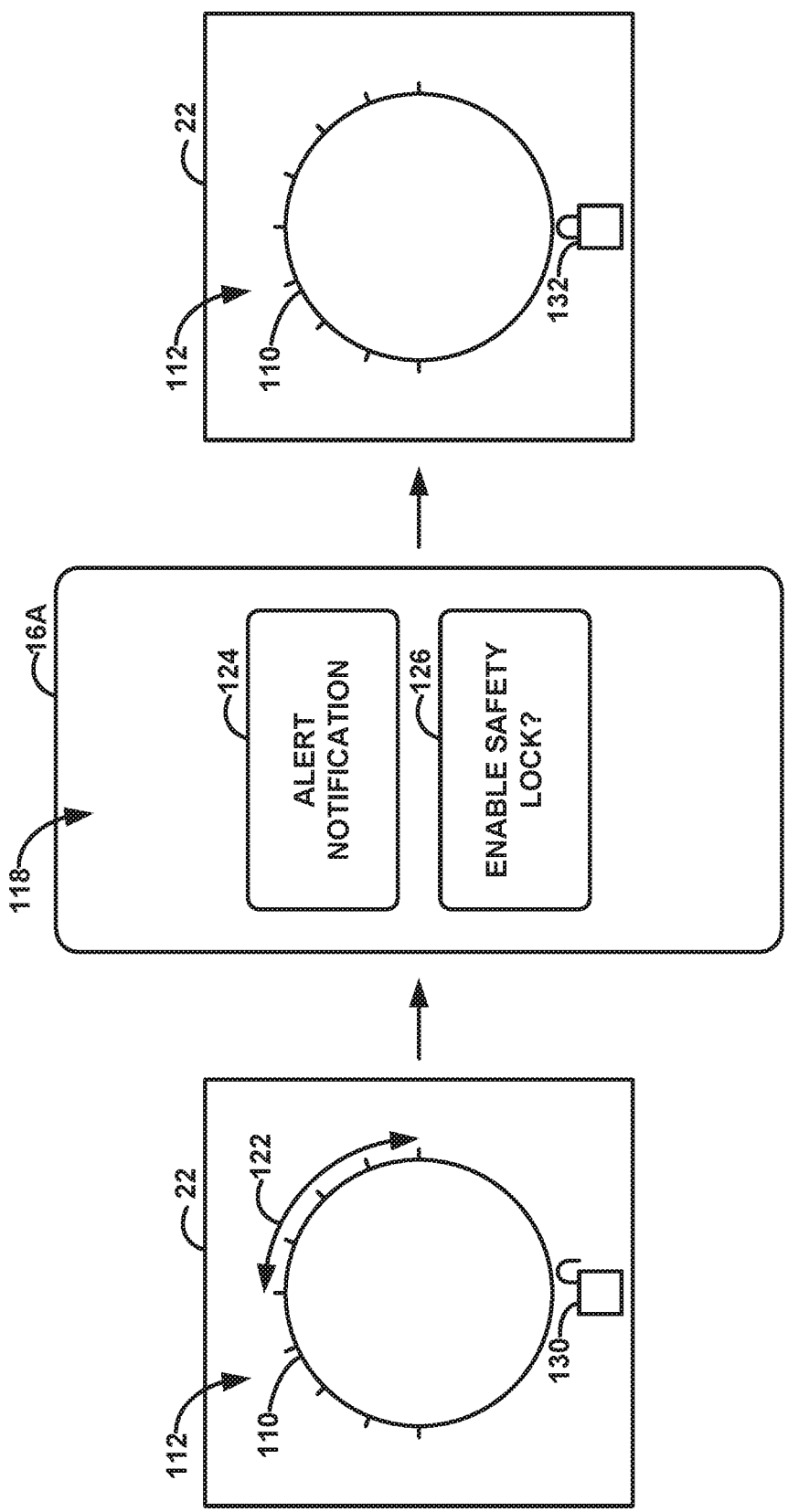
FIG. 4 is a conceptual diagram illustrating an example process for disabling an ability to set a control parameter of the controller of FIG. 1, in accordance with one or more techniques of this disclosure.

FIG. 4 is a conceptual diagram illustrating an example process for disabling an ability to set a control parameter of controller 22, in accordance with one or more techniques of this disclosure. For example, user interface 110 of controller 22 may represent a dial. The dial may be rotated according to rotation 122. During the rotation 122, an ability to set the control parameter of controller 22 may be enabled, as indicated by the "unlocked" symbol 130 shown by display 112 of controller 22. In some examples, the rotation 122 of user interface 110 may represent an attempt to set the control parameter. Although not illustrated in FIG. 4, display 112 may show information indicative of the control parameter as the attempt to set the control parameter is being made via rotation 122 of controller 22.

In some examples, controller 22 may determine that the attempt to set the control parameter caused by the rotation 122 of user interface 110 represents an irregular attempt to set the control parameter. Such an irregular attempt may result in exposure to uncomfortable or dangerous conditions for one or more users of a system (e.g., system 10 of FIG. 1) regulated by controller 22. Responsive to determining that rotation 122 represents an irregular attempt to set the control parameter of controller 22, controller 22 may generate information indicating the irregular attempt and output the information to user device 16A. In the example illustrated in FIG. 4, display 118 of user device 16A may display an alert notification 124 and display a prompt to enable a safety lock 126 in response to receiving information indicative of the irregular attempt to set the control parameter of controller 22, although this is not required. In other examples not illustrated in FIG. 4, display 118 may display only one or none of the alert notification 124 and the prompt 126 in response to receiving the information indicative of the irregular attempt to set the control parameter.

In some examples, display 118 may receive a user input indicating a selection of the prompt to enable the safety lock 126. In response to receiving the user input, user device 16A may output a signal to disable an ability to change the control parameter of controller 22. Subsequently, controller 22 may disable the ability to change the control parameter and display the locked symbol 132 indicating that the ability to change the control parameter is disabled.

Figure 5:
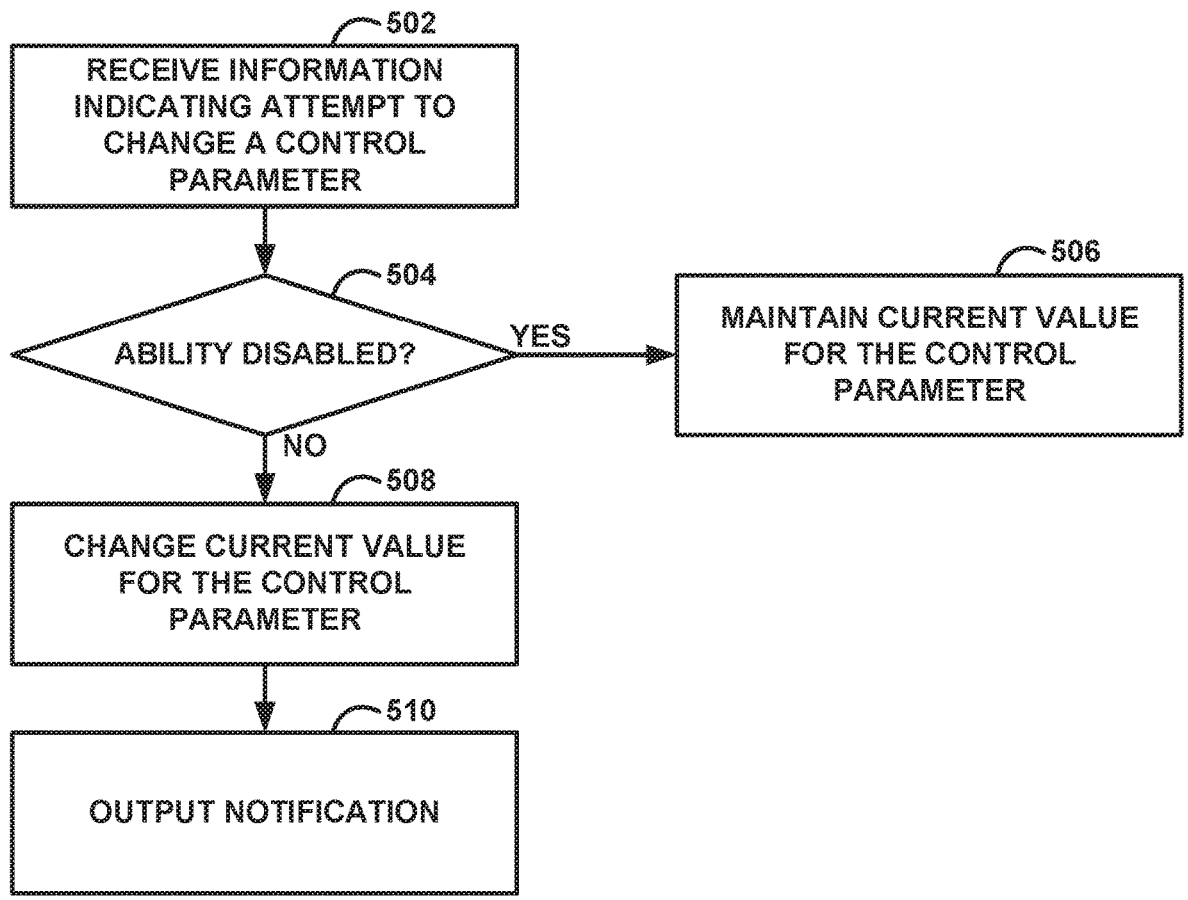
FIG. 5 is a flow diagram illustrating an example process for controlling a parameter, in accordance with one or more techniques of this disclosure.

FIG. 5 is a flow diagram illustrating an example process for controlling a parameter, in accordance with one or more techniques of this disclosure. For convenience, FIG. 5 is described with respect to system 10, system 21, and system 30 of FIGS. 1-3. However, the techniques of FIG. 5 may be performed by different components of system 10, system 21, and system 30 or by additional or alternative devices.

Processing circuitry 102 may receive information indicating an attempt to change a control parameter (502) that is regulated by controller 22. In some examples, controller 22 may include user interface 110, where processing circuitry 102 may receive the attempt to change the control parameter by identifying a user input to user interface 110. Processing circuitry 102 may be configured to determine whether an ability to change the control parameter is disabled (504). If the ability to change the control parameter is disabled ("YES" branch of block 504), processing circuitry 102 may maintain a current value for the control parameter (506). If the ability to change the control parameter is not disabled ("NO" branch of block 504), processing circuitry 102 may change the current value for the control parameter (508). Subsequently, processing circuitry 102 may output a notification (510) of the parameter change.

Figure 6:
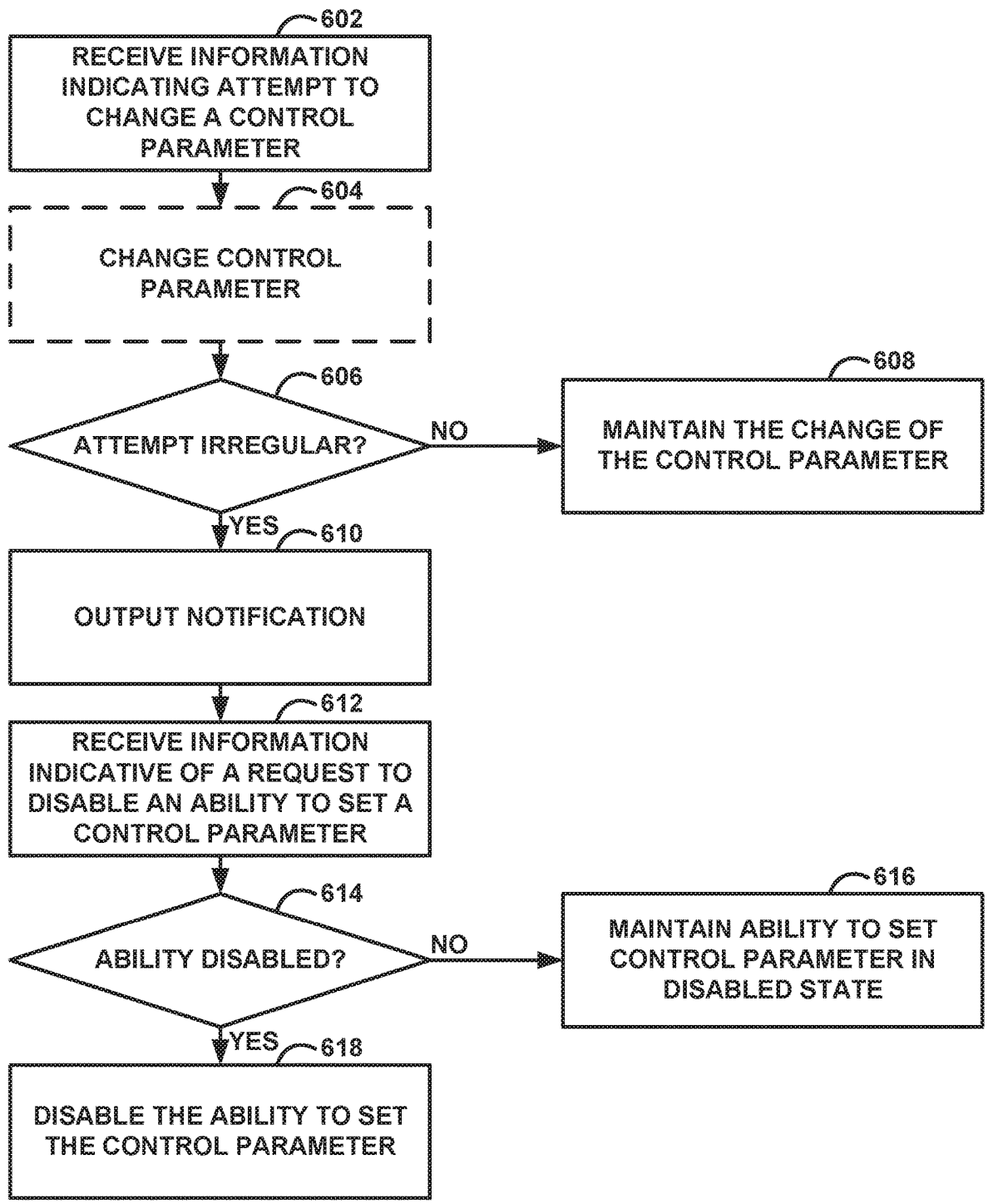
FIG. 6 is a flow diagram illustrating an example process for controlling an ability to set a control parameter of the controller of FIG. 1, in accordance with one or more techniques of this disclosure.

FIG. 6 is a flow diagram illustrating an example process for controlling an ability to set a control parameter of a controller 22, in accordance with one or more techniques of this disclosure. For convenience, FIG. 6 is described with respect to system 10, system 21, and system 30 of FIGS. 1-3. However, the techniques of FIG. 6 may be performed by different components of system 10, system 21, and system 30 or by additional or alternative devices.

Processing circuitry 102 may receive information indicating an attempt to change a control parameter (602). In some examples, the information indicating the attempt to change the control parameter is generated by user interface 110 in response to a rotation of a dial that is a part of user interface 110. In some examples, controller 22 receives the information indicating the attempt to change the control parameter is for one of user devices 16 via network 18. In some examples, processing circuitry 102 changes the control parameter (604) in response to the attempt to change the control parameter, however this is not required. In some examples, processing circuitry 102 determines whether the attempt to change the control parameter is an irregular attempt (606)

An irregular attempt to change the control parameter may represent an attempt to change the control parameter in a way which may cause discomfort to one or more users who come in contact with water that is held by water tank 40 and output to a piping system. In some examples, to determine if the attempt to change the control parameter of controller 22 represents an irregular attempt to change the control parameter from a first control parameter value to a second control parameter value, processing circuitry 102 is configured to determine whether the second control parameter value is outside a range of control parameter values from a first threshold control parameter value to a second threshold control parameter value. For example, processing circuitry 102 may determine if the second control parameter value is less than a first threshold control parameter value or determine if the second control parameter value is greater than a second threshold control parameter value, where the second threshold control parameter value is greater than the first control parameter value. The first threshold control parameter value may represent a control parameter value which would represent a lower bound of a comfort range for water held by a water tank and the second threshold control parameter value may represent a control parameter value which would represent an upper bound of the comfort range.

Processing circuitry 102 may determine that the attempt to change the control parameter of the controller represents an irregular attempt if the second control parameter value is less than the first threshold control parameter value or if the second control parameter value is greater than the second threshold control parameter value. In other words, of the second, intended control parameter value would place the control parameter value outside of the comfort range, processing circuitry 102 may determine that the attempt is an irregular attempt. In some examples, the irregular attempt to change the control parameter may represent an attempt by a child or a vulnerable adult to change the control parameter value in a potentially uncomfortable or dangerous manner. For example, a child may turn a dial of user interface 110, which may represent the irregular attempt to change the parameter value.

In some examples, to determine if the attempt to set the control parameter of the controller 22 represents an irregular attempt, processing circuitry 102 is configured to calculate a magnitude of a difference between the first control parameter value and the second control parameter value. Subsequently, processing circuitry 102 may determine that the attempt to change the control parameter of the controller represents the irregular attempt if the magnitude of the difference between the first control parameter value and the second control parameter value is greater than a threshold difference value. In examples where the control parameter represents a set point temperature for water held by a water tank, it may be unusual to change the set point temperature of the water held by the water tank by a more than a margin such as the threshold difference value.

In examples where processing circuitry 102 determines that the attempt to change the control parameter does not represent an irregular attempt ("NO" branch of block 606), processing circuitry 102 may maintain the change of the control parameter (608). In some examples, processing circuitry 102 might not change the control parameter subsequent to receiving the information indicating the attempt to change the control parameter, and processing circuitry 102 changes the control parameter after confirming that the attempt is not regular at block 606. In examples where processing circuitry 102 determines that the attempt to change the control parameter represents an irregular attempt ("YES" branch of block 606), processing circuitry 102 outputs a notification (610) which indicates that the attempt to change the control parameter represents an irregular attempt.

Subsequently, processing circuitry 102 may receive information indicative of a request to disable an ability to set a control parameter (612). Processing circuitry 102 may determine whether an ability to change the control parameter is disabled (614). If the ability to change the control parameter is not disabled ("NO" branch of block 614), processing circuitry 102 maintains an ability to set the control parameter in a disabled state (616). If the ability to change the control parameter is disabled ("YES" branch of block 614), processing circuitry 102 disables the ability to set the control parameter (618). In some examples, processing circuitry 102 may revers a change in the control parameter in response to disabling the ability to set the control parameter.

In one or more examples, the systems described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some respects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A controller configured to control a temperature of water contained by a water tank, wherein the controller comprises:
 a user interface configured to receive one or more user inputs indicative of a request to set a control parameter of the controller;
 communication circuitry configured to receive, from a user device, an electronic signal; and
 processing circuitry configured to:
  identify, from the electronic signal, one or more first data packets that include a request to disable an ability to change, based on the one or more user inputs received by the user interface, the control parameter of the controller; and
  in response to receiving the one or more first data packets, disable the ability to change the control parameter of the controller.

2. The controller of claim 1, wherein the control parameter of the controller comprises a value corresponding to a set point temperature for the water contained by the water heater.

3. The controller of claim 1, wherein the electronic signal is a first electronic signal, wherein the communication circuitry is further configured to receive a second electronic signal, and wherein the processing circuitry is further configured to:
identify, from the electronic signal, one or more second data packets that include a request to enable an ability to change, based on the one or more user inputs received by the user interface, the control parameter of the controller; and
in response to receiving the one or more second data packets, enable the ability to change the control parameter of the controller.

4. The controller of claim 3, wherein the processing circuitry is further configured to:
when the ability to set the control parameter of the controller is enabled, change a value for the control parameter in response to receiving one or more user inputs at the user interface.

5. The controller of claim 3, wherein the processing circuitry is further configured to:
when the ability to set the control parameter of the controller is disabled, keep a same value for the control parameter in response to receiving one or more user inputs at the user interface.

6. The controller of claim 1, wherein the processing circuitry is further configured to:
determine that the request to set the control parameter of the controller represents an attempt to change the control parameter of the controller from a first control parameter value to a second control parameter value; and
determine if the attempt to change the control represents an irregular attempt to change the control parameter.

7. The controller of claim 6, wherein to determine if the attempt to change the control parameter represents the irregular attempt, the processing circuitry is configured to:
determine if the second control parameter value is less than a first threshold control parameter value; or
determine if the second control parameter value is greater than a second threshold control parameter value, wherein the second threshold control parameter value is greater than the first control parameter value; and
determine that the attempt to change the control parameter of the controller represents the irregular attempt if the second control parameter value is less than the first threshold control parameter value or if the second control parameter value is greater than the second threshold control parameter value.

8. The controller of claim 6, wherein to determine if the attempt to change the control parameter represents the irregular attempt, the processing circuitry is configured to:
calculate a magnitude of a difference between the first control parameter value and the second control parameter value; and
determine that the attempt to change the control parameter of the controller represents the irregular attempt if the magnitude of the difference between the first control parameter value and the second control parameter value is greater than a threshold difference value.

9. The controller of claim 6, wherein the processing circuitry is further configured to:
generate, in response to determining that the attempt to change the control parameter of the controller represents the irregular attempt, a notification of the irregular attempt; and
output the notification of the irregular attempt to a user device, wherein the notification includes a prompt to disable the ability to set the control parameter of the controller.

10. The controller of claim 9, wherein to receive the electronic signal, the processing circuitry is configured to receive a response to the prompt to disable the ability to set the control parameter, wherein the response includes a user input indicative of the request to disable the ability to change the control parameter.

11. A method for controlling a temperature of water contained by a water tank, the method comprising:
receiving, by a user interface, one or more user inputs indicative of a request to set a control parameter of the controller; and
receiving, by communication circuitry from a user device, an electronic signal;
identifying, by processing circuitry from the electronic signal, one or more first data packets that include a request to disable an ability to change, based on the one or more user inputs received by the user interface, the control parameter of the controller; and
in response to receiving the one or more first data packets, disabling, by the processing circuitry, the ability to change the control parameter of the controller.

12. The method of claim 11, wherein the electronic signal is a first electronic signal, wherein the communication circuitry is further configured to receive a second electronic signal, and wherein the method further comprises:
identifying, by the processing circuitry from the electronic signal, one or more second data packets that include a request to enable an ability to change, based on the one or more user inputs received by the user interface, the control parameter of the controller; and
in response to receiving the one or more second data packets, enabling, by the processing circuitry, the ability to change the control parameter of the controller.

13. The method of claim 12, wherein method further comprises changing, when the ability to set the control parameter of the controller is enabled, a value for the control parameter in response to receiving one or more user inputs at the user interface.

14. The method of claim 12, wherein the method further comprises keeping, when the ability to set the control parameter of the controller is disabled, a same value for the control parameter in response to receiving one or more user inputs at the user interface.

15. The method of claim 11, wherein the method further comprises:
determining, by the processing circuitry, that the request to set the control parameter of the controller represents an attempt to change the control parameter of the controller from a first control parameter value to a second control parameter value; and
determining, by the processing circuitry, if the attempt to change the control represents an irregular attempt to change the control parameter.

16. The method of claim 15, wherein determining if the attempt to change the control parameter represents the irregular attempt comprises:
determining if the second control parameter value is less than a first threshold control parameter value; or determining if the second control parameter value is greater than a second threshold control parameter value, wherein the second threshold control parameter value is greater than the first control parameter value; and determining that the attempt to change the control parameter of the controller represents the irregular attempt if the second control parameter value is less than the first threshold control parameter value or if the second control parameter value is greater than the second threshold control parameter value.

17. The method of claim 15, wherein determining if the attempt to change the control parameter represents the irregular attempt comprises:

calculating a magnitude of a difference between the first control parameter value and the second control parameter value; and determining that the attempt to change the control parameter of the controller represents the irregular attempt if the magnitude of the difference between the first control parameter value and the second control parameter value is greater than a threshold difference value.

18. The method of claim 15, further comprising:

generating, by the processing circuitry in response to determining that the attempt to change the control parameter of the controller represents the irregular attempt, a notification of the irregular attempt; and outputting, by the processing circuitry, the notification of the irregular attempt to a user device, wherein the notification includes a prompt to disable the ability to set the control parameter of the controller.

19. The method of claim 18, wherein receiving the electronic signal comprises receiving a response to the prompt to disable the ability to set the control parameter, wherein the response includes a user input indicative of the request to disable the ability to change the control parameter.

20. A system comprising:

a user device; and a controller configured to control a temperature of water contained by a water tank, wherein the controller comprises:

a user interface configured to receive one or more user inputs indicative of a request to set a control parameter of the controller;

communication circuitry configured to receive, from the user device, an electronic signal; and processing circuitry configured to:

identify, from the electronic signal, one or more first data packets that include a request to disable an ability to change, based on the one or more user inputs received by the user interface, the control parameter of the controller; and in response to receiving the one or more first data packets, disable the ability to change the control parameter of the controller.

* * * * *